United States Patent [19]
Kubota et al.

[11] Patent Number: 5,776,989
[45] Date of Patent: Jul. 7, 1998

[54] METHOD OF RECYCLING CURED UNSATURATED POLYESTER RESIN WASTE

[75] Inventors: Shizuo Kubota; Osamu Ito; Hiroyuki Miyamoto, all of Wakayama, Japan

[73] Assignees: Wakayama Prefecture; Miyaso Chemical Co., both of Wakayama, Japan

[21] Appl. No.: 648,816

[22] Filed: May 16, 1996

[30] Foreign Application Priority Data

Feb. 19, 1996 [JP] Japan ............................ 8-030570

[51] Int. Cl.$^6$ ............................................. C08J 11/04
[52] U.S. Cl. .............................................. 521/48; 521/48.5
[58] Field of Search ............................... 521/48, 48.5

[56] References Cited

U.S. PATENT DOCUMENTS

| | | | |
|---|---|---|---|
| 4,016,115 | 4/1977 | Miyake et al. | 521/48 |
| 4,118,187 | 10/1978 | Sidebotham et al. | 521/48 |
| 5,045,122 | 9/1991 | Tindall et al. | 134/29 |
| 5,554,657 | 9/1996 | Brownscombe et al. | 521/48 |

FOREIGN PATENT DOCUMENTS

| | | |
|---|---|---|
| 58-057438 a | 4/1983 | Japan . |
| 4-505930 | 10/1992 | Japan . |
| WO95/29205 | 11/1995 | WIPO . |

OTHER PUBLICATIONS by Yoshihiro Fukuda, Kagaku to Kogyo, 68 (2), 60 (1994).

by Yoshinari Kobayashi, Kagaku to Kogyo, 66 (10), 452 (1992).

by Kazuhide Hamada, Jun Hosokawa and Masashi Nishiyama, Kobunshi Ronbun–Shuk, 49 (8), 655 (1992).

by Yoshio Kobayashi, Dai 42–Kai Kobunshi Kaki–Daigaku Koen, Yoshi–shu, p. 134 (1994).

Primary Examiner—Morton Foelak
Attorney, Agent, or Firm—Armstrong, Westerman, Hattori, McLeland & Naughton

[57] ABSTRACT

A method which can recycle waste by chemically treating cured unsaturated polyester resin waste and obtaining industrially useful raw material is provided. The cured unsaturated polyester resin waste is decomposed with a decomposition component such as dicarboxylic acid or diamine, to obtain resin raw material. Unsaturated polyester resin is re-synthesized with this resin raw material, to chemically recycle the same.

14 Claims, 2 Drawing Sheets

METHOD OF RECYCLING CURED UNSATURATED POLYESTER RESIN WASTE

BACKGROUND OF THE INVENTION

1. Field of the Invention

The present invention relates to a method of recycling cured unsaturated polyester resin waste, and more particularly, it relates to a method of recycling cured unsaturated polyester resin waste by chemically treating the same and obtaining industrially valuable raw material.

2. Description of the Background Art

For example, most buttons are made of cured unsaturated polyester resin. Such buttons are manufactured by punching out a sheet of cured unsaturated polyester resin-and scraping the obtained intermediate products. However, the quantity of chips and shavings resulting from these manufacturing steps occupies about 50% of the raw material.

On the other hand, the disposal of fiber reinforced plastic products such as an FRP ship and a bathtub having matrices prepared from unsaturated polyester resin is a serious problem. Thus, recycling of such cured unsaturated polyester resin waste is awaited.

However, the cured unsaturated polyester resin is a thermosetting resin which has a three-dimensional network structure, and hence its waste cannot be remelted to be remolded, dissimilar to thermoplastic resin such as polypropylene, for example. Further, the cured unsaturated polyester resin cannot be dissolved in a solvent either.

To this end, there has been studied a method of pulverizing fiber reinforced plastic (FRP) waste having a matrix of cured unsaturated polyester resin and recycling the same as a filler as such (by Yoshihiro Fukuda, Kagaku to Kogyo, 68 (2), 60 (1994)). However, it has been confirmed by the inventors that this method encounters such a problem that the strength of the regenerated resin is reduced as the quantity of the waste powder is increased and the strength entirely depends on the quantity of new unsaturated polyester resin.

On the other hand, there has also been studied a method of decomposing the aforementioned FRP under a water vapor atmosphere at a temperature of 500° C. for obtaining a component such as phthalic acid (by Yoshinari Kobayashi, Kagaku to Kogyo, 66 (10), 452 (1992), by Kazuhide Hamada, Jun Hosokawa and Masashi Nishiyama, Kobunshi Ronbun-Shu, 49 (8), 655 (1992), and by Yoshio Kobayashi, Dai 42-Kai Kobunshi Kaki-Daigaku Koen Yoshi-Shu, p. 134 (1994)). Further, a water vapor pyrolytic furnace for FRP has also been devised. However, a high temperature of 500° C. is necessary for pyrolyzing FRP, and hence this method cannot be executed without specific equipment. Further, glass fiber which is contained in FRP is deteriorated due to the high temperature.

SUMMARY OF THE INVENTION

Accordingly, an object of the present invention is to provide a method of recycling cured unsaturated polyester resin by chemically treating the same and obtaining industrially valuable raw material through simple equipment, i.e., a method of chemically recycling cured unsaturated polyester resin waste.

In order to solve the aforementioned problems, the inventors have invented a method of recycling cured unsaturated polyester resin waste by crushing the cured unsaturated polyester resin waste, thereafter decomposing the same with dicarboxylic acid, diamine or the like at a temperature of about 100° to 300° C., employing the resulting decomposition product as a resin component, and resynthesizing unsaturated polyester resin or the like thereby chemically recycling the same.

Namely, a method of recycling cured unsaturated polyester resin waste according to the present invention comprises the step of decomposing the cured unsaturated polyester resin waste with at least one component which is selected from a group consisting of saturated dicarboxylic acid, unsaturated dicarboxylic acid, saturated dicarboxylic acid alkyl ester, saturated dicarboxylic acid aryl ester, unsaturated dicarboxylic acid alkyl ester, unsaturated dicarboxylic aryl ester, diamine, bisphenol derivative, bisphenol derivative ester, dihydric phenol, dihydric phenol ester, dithiol, dithiol ester, amino alcohol, amino alcohol ester, aminocarboxylic acid, aminocarboxylic acid alkyl ester, aminocarboxylic acid aryl ester, aminophenol, aminophenol ester, hydroxycarboxylic acid, hydroxycarboxylic acid ester, mercaptocarboxylic acid, mercaptocarboxylic acid ester, monocarboxylic acid, monocarboxylic acid ester, monoalcohol, monoalcohol ester, monophenol, monophenol ester, monothiol, monothiol ester, water and glycol ester thereby obtaining resin raw material.

Preferably, the cured unsaturated polyester resin waste is decomposed under pressure.

The present invention is applicable to recycling of not only waste of resin which is employed for manufacturing the aforementioned buttons, but wide-ranging general cured unsaturated polyester resin waste. Further, the cured unsaturated polyester resin to which the present invention is applied may contain a filler of calcium carbonate or the like, or may be a composite material which is composed with glass fiber. Above all, the present invention is particularly preferably applied to FRP (fiber reinforced plastic).

In the present invention, the cured unsaturated polyester resin waste is preferably subjected to a pretreatment of crushing and screening the same, to be thereafter decomposed. Decomposition of the waste is further facilitated by the pretreatment. The waste can be crushed through an impact crusher (hammer or chain type), a shearing crusher, a cutting crusher, a compression crusher (roll, conveyor or screw type), a stamp mill, a ball mill or a rod mill, for example. The grain size of waste powder obtained by such crushing is preferably minimized, and powder which is passed through a screen having a sieve opening of 0.5 mm, preferably 0.3 mm, more preferably 0.1 mm, for example, is advantageously employed.

When cured unsaturated polyester resin waste containing a filler is decomposed in the present invention, the filler can be separated at the time of crushing before decomposition, or after decomposition.

In the present invention, the weight ratio of the cured unsaturated polyester resin waste to a compound employed for decomposition is 1:0.2 to 30, preferably 1:0.5 to 10. The molecular weight of the decomposition product can be adjusted by changing this value. The molecular weight of the decomposition product is increased if the amount of a decomposition reagent is small, while the former is reduced if the latter is large.

The decomposed liquid can be added to a new decomposition reagent, for further decomposing cured unsaturated polyester resin waste. Further, waste resin can be efficiently recycled by separating an excess decomposition reagent from the decomposition product.

In the present invention, examples of the saturated dicarboxylic acid are oxalic acid, malonic acid, succinic acid, chlorosuccinic acid, bromosuccinic acid, glutaric acid, adipic acid, pimelic acid, suberic acid, azelaic acid, sebacic acid, brassilic acid, methylmalonic acid, ethylmalonic acid, dimethylmalonic acid, methylsuccinic acid, 2,2-dimethylsuccinic acid, 2,3-dimethylsuccinic acid, tetramethylsuccinic acid, phthalic acid, chlorophthalic acid, isophthalic acid, terephthalic acid, 5-methylisophthalic acid, tetrahydrophthalic acid, methyltetrahydrophthalic acid, endomethylene tetrahydrophthalic acid, tetrabromophthalic acid, chlorendic acid, phenylsuccic acid, o-carboxyphenylacetic acid and o-phenylenediacetic acid, and examples of the unsaturated dicarboxylic acid are maleic acid, chloromaleic acid, fumaric acid, chlorofumaric acid, citraconic acid, mesaconic acid, glutaconic acid, itaconic acid, allylmalonic acid, isopropylidenesuccinic acid and muconic acid.

Terephthalic acid which is discharged in alkali weight reduction of polyester fiber can also be employed as the saturated dicarboxylic acid.

Examples of the diamine are ethylenediamine, propylenediamine, trimethylenediamine, tetramethylenediamine, pentamethylenediamine, hexamethylenediamine, diethylenetriamine, tetraethylenepentamine, 4,4'-diaminodiphenylmethane, 3,3'-dimethyl-4,4'-diaminodiphenylmethane, phenylenediamine, tolylenediamine and diaminodiphenylamine.

Examples of the bisphenol derivative are 2,2-bis(4-hydroxyphenyl)propane (bisphenol A), tetramethyl bisphenol A, 2,2-bis(4-hydroxyphenyl)hexaphloropropane, α, α'-bis(4-hydroxyphenyl)-1,4-diisopropylbenzene, 2,2-bis(4hydroxyphenyl)butane, 1,1-(4-hydroxyphenyl)-1-phenylethane (bisphenol AP), bis(4-hydroxyphenyl)sulfide, bis(4-hydroxyphenyl)sulfone (bisphenol S), tetramethyl bisphenol S, bis(hydroxyphenyl)methane (bisphenol F), tetramethyl bisphenol F, 2,2'-methylenebis(p-cresol), 1,1-bis(4hydroxyphenyl)ethane (bisphenol E), dihydroxydiphenyl ether, 1,1-bis(4-hydroxyphenyl)cyclohexane (bisphenol Z), 2,2-bis(3-methyl-4-hydroxyphenyl)propane (bisphenol C), bis(3-hydroxyphenoxy)ethane, bis(3-hydroxyphenoxy)benzene, bis(3-hydroxyphenyl)amine, 4,4'-biphenol, tetrabromobiphenol and 1,1'-bis(2-hydroxynaphthyl)sulfide.

Examples of the dihydric phenol are o-dihydroxybenzene, m-dihydroxybenzene, p-dihydroxybenzene (hydroquinone), 3,4-toluenediol, 2,4-toluenediol, 3,5-toluenediol, 2,5-toluenediole, p-xylene-2,6-diol, m-xylene-4,6-diol, and pxylene-2,5-diol.

Examples of the dithiol are ethanedithiol, 1,3-propanedithiol, 1,4-butanedithiol, 1,4-benzenedithiol, toluenedithiol and xylene-α, α'-dithiol.

Examples of the amino alcohol are 2-aminoethanol, 2-amino-1-butanol, 2-amino-2-methyl-1-propanol, ethanolamine, ethyldiethanolamine and butyldiethanolamine, and examples of aminophenol are o-aminophenol, aminocresol and p-(2-aminoethyl)phenol.

Examples of the hydroxycarboxylic acid are glycolic acid, lactic acid, 2-hydroxybutyric acid, 2-hydroxy-2-methylpropanoic acid, 2-hydroxy-4-methylpentanoic acid, 2-ethyl-2-hydroxybutyric acid, 3-hydroxypropionic acid, 10-hydroxystearic acid, 12-hydroxy-9-octadecenoic acid, 3,3,3-trichloro-2-hydroxypropionic acid, hydroxybenzoic acid, salicylic acid, 5-chlorosalicylic acid, methylsalicylic acid, hydroxyphenylacetic acid, 3-(ohydroxyphenyl)propionic acid, mandelic acid, phenyllactic acid, 3-hydroxyphenylpropionic acid and hydroxycinnamic acid, examples of mercaptocarboxylic acid are mercaptoacetic acid, mercaptosuccinic acid and thiosalicylic acid, and examples of aminocarboxylic acid are glycine, alanine, 3-aminopropionic acid, 2-aminobutyric acid, 3-aminobutyric acid, 4-aminobutyric acid, α-aminovaleric acid, α-aminoisovaleric acid, 2-amino-2-methylbutyric acid, α-aminohexanoic acid, 2-amino-4-methylvaleric acid, 2-amino-3-methylvaleric acid, serine, threonine, cysteine, phenylalanine, 3-amino-3-phenylpropionic acid, aminobenzoic acid and aminocinnamic acid.

Examples of the carboxylic alkyl ester and carboxylic aryl ester are esters of methyl with an alkyl group having carbon number of 1 to 4, ethyl, n-propyl, isopropyl, n-butyl, isobutyl, sec-butyl, tert-butyl and phenyl, and exemplary esters of phenol, thiol and alcohol are esters of formic acid, acetic acid, propionic acid, butyric acid, isobutyric acid and benzoic acid.

In the present invention, a catalyst is preferably employed for decomposition. Examples of the catalyst for decomposition are sodium hydroxide, potassium hydroxide, sodium methylate, sodium ethylate, acetic acid metallic salts such as zinc acetate, magnesium acetate, calcium acetate, lithium acetate and sodium acetate, antimony oxide, tributyl tin methoxide, and mixtures thereof. However, the cured unsaturated polyester resin waste can be decomposed with no catalyst.

In the present invention, the decomposition temperature must be about 100° C. to 300° C. A high decomposition rate can be preferably attained at a decomposition temperature of 200° C. to 300° C. At this degree of temperature, no glass fiber is deteriorated in the decomposition of waste FRP.

In the present invention, the cured unsaturated polyester resin waste is preferably decomposed under a nitrogen atmosphere, so that coloring caused by oxidative reaction etc. can be prevented.

In the present invention, the cured unsaturated polyester resin waste can be decomposed either under the atmosphere or under pressure. When a dicarboxylic acid or a diamine having a low boiling point is employed, for example, the reaction can be conducted at a temperature exceeding the boiling point by decomposing the cured unsaturated polyester resin waste under pressure. In order to conduct the reaction under pressure, a reaction vessel is preferably sealed, in consideration of the aforementioned prevention of oxidation.

Among the components for decomposition which can be employed in the present invention, dicarboxylic acid, diamine, bisphenol derivative and dithiol are particularly preferable since the same can readily decompose the cured unsaturated polyester resin waste at a high decomposition rate.

According to the present invention, further, the decomposition product of the cured unsaturated polyester resin waste obtained in the aforementioned manner can be effectively used as raw material for obtaining industrially useful resin. For example, a decomposition product produced with a saturated dicarboxylic acid or a saturated dicarboxylic acid ester can be reacted with an unsaturated dibasic acid and glycol, to obtain regenerated unsaturated polyester resin. A decomposition product produced with an unsaturated dicarboxylic acid or a unsaturated dicarboxylic acid ester can be reacted with glycol, and a saturated dibasic acid if necessary, to obtain a regenerated unsaturated polyester resin. A decomposition product produced with a diamine, bisphenol derivative, bisphenol derivative ester, dihydric phenol, dihydric phenol ester, dithiol, dithiol ester, amino alcohol, amino alcohol ester, aminophenol, aminophenol ester or glycol ester can be reacted with an unsaturated dibasic acid, and a saturated dibasic acid if necessary, to obtain a regenerated unsaturated polyester resin. A decomposition product produced with a aminocarboxylic acid, an aminocarboxylic acid ester, a hydroxycarboxylic acid, a hydroxycarboxylic acid ester, a mercaptocarboxylic acid or a mercaptocarboxylic acid ester can be reacted with an unsaturated dibasic acid and a glycol, to a obtain regenerated unsaturated polyester resin. A decomposition product produced with a monocarboxylic acid, a monoalcohol, a monophenol, a monothiol, a monocarboxylic acid ester, a monoalcohol ester, a monophenol ester, a monothiol ester or water can be reacted with an unsaturated dibasic acid a and a glycol, and saturated dibasic acid if necessary, after removing unreacted excess monocarboxylic acid, monoalcohol, monophenol, monothiol, monocarboxylic acid ester, monoalcohol ester, monophenol ester, monothiol ester or water, to obtain a regenerated unsaturated polyester resin.

The regenerated unsaturated polyester resin obtained in the aforementioned manner can be cross-linked by a vinyl monomer or diallyl phthalate which is copolymerizable with styrene, methyl methacrylate, vinyl toluene or a fumaric acid ester component such as vinyl acetate under the presence of a polymerization initiator, to obtain a cured unsaturated polyester resin. This regenerated resin can be repeatedly regenerated.

Namely, a decomposition product produced with a dicarboxylic acid is employed for resin raw material as dicarboxylic acid. A decomposition product produced with a diamine is employed as resin raw material having an amino group on its end. A decomposition product produced with a bisphenol is employed as resin raw material having a phenol group on its end. A decomposition product produced with a dithiol is employed as resin raw material having a thiol group on its end.

A decomposition product of cured unsaturated polyester resin waste can also be employed for re-synthesis as a component of an unsaturated dibasic acid, a saturated dibasic acid or a glycol, as described below. In this case, the regenerated resin as obtained can be repeatedly decomposed and re-synthesized.

For example, a decomposition product produced with a bisphenol derivative, a dihydric phenol, a dithiol, amino alcohol or an aminophenol can be reacted with a diisocyanate, to obtain regenerated polyurethane. A decomposition product produced with a diamine can be reacted with a diisocyanate, to obtain regenerated polyurea.

A decomposition product produced with a diamine can be reacted with a dicarboxylic acid chloride or a dicarboxylic acid ester, to synthesize regenerated polyamide. A decomposition product produced with dicarboxylic acid or a dicarboxylic acid ester can be reacted with diamine, to synthesize regenerated polyamide. A decomposition product produced with a diamine can be reacted with that through dicarboxylic acid or dicarboxylic acid ester, to synthesize regenerated polyamide.

The decomposition product produced with a diamine can be employed as a hardener for epoxy resin, to synthesize regenerated epoxy resin.

A decomposition product produced with a bisphenol, a dihydric phenol or an aminophenol can be reacted with formaldehyde, to synthesize regenerated phenol resin.

Unsaturated polyester resin can be synthesized by an ordinary method. Namely, a reaction temperature is set at 140° C. to 230° C., and condensation is made for about 2 to 6 hours while distilling away water under nitrogen. After cooling, 30 to 40% of styrene is introduced, with addition of 0.02 parts of hydroquinone serving as a polymerization inhibitor.

Regenerated unsaturated polyester resin which is regenerated in the aforementioned manner can be employed as a molding material, an adhesive or a paint. Such a resin is molded by generally employed hand layup molding, centrifugal drum molding, compression molding, cast molding, injection molding, reaction injection molding, transfer molding or the like.

The aforementioned decomposition and re-synthesis of unsaturated polyester resin waste according to the present invention can be executed by the following recycling apparatus:

The recycling apparatus for unsaturated polyester resin waste for carrying out the present invention comprises a stainless reaction vessel, first inject means for injecting a decomposition component into the reaction vessel, second injection means for injecting a catalyst into the reaction vessel, third injection means for injecting unsaturated polyester resin waste into the reaction vessel, heating means for heating the reaction vessel, cooling means for cooling the reaction vessel, a cooler for liquefying volatile components including a sublimable component which is generated from the reaction vessel, a trap which is provided on a path leading from the reaction vessel to the cooler for removing the sublimable component generated from the reaction vessel, an outlet port which is provided on the reaction vessel for taking out a decomposed liquid obtained by decomposition reaction in the reaction vessel, a centrifugal separator for centrifugally separating the decomposed liquid which is taken out from the outlet port, fourth injection means for injecting the decomposed liquid from which precipitates are removed by centrifugation through the centrifugal separator into the reaction vessel again for re-synthetic reaction, fifth injection means for injecting a re-synthesis component into the reaction vessel, a nitrogen inlet tube for introducing nitrogen gas into the reaction vessel which is in the process of re-synthetic reaction, and means for efficiently decomposing resulting water, and is adapted to re-synthesize regenerated unsaturated polyester resin in the reaction vessel while heating and stirring the same by the heating means and a stirrer respectively.

Preferably, the reaction vessel is sealable.

An example of such a recycling apparatus is now described with reference to the drawings.

Figure 1:
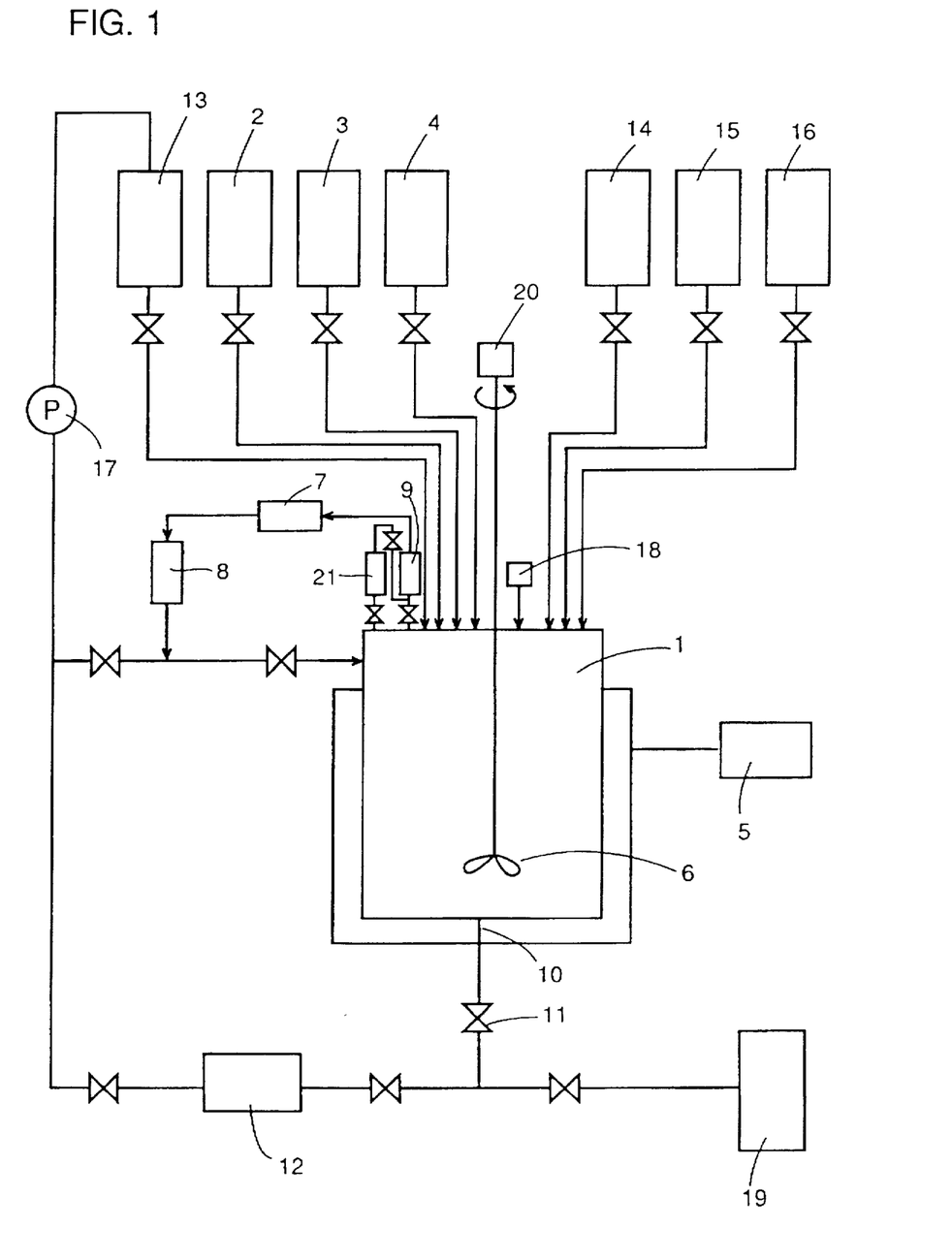
FIG. 1 schematically illustrates the structure of an exemplary recycling apparatus for cured unsaturated polyester resin waste for carrying out the present invention.

Referring to FIG. 1, the recycling apparatus comprises a stainless reaction vessel 1. A waste resin tank 4, tanks 2 and 3 for injecting decomposition chemicals such as a catalyst and dicarboxylic acid respectively, a decomposed liquid tank 13, and tanks 14, 15 and 16 for injecting chemicals such as maleic anhydride, propylene glycol and styrene respectively are provided above the reaction vessel 1, while the apparatus further comprises a nitrogen gas inject tube 18, a trap 9, a condenser 7, a receiver 8 and a stirrer 20. Heating is performed by a head medium boiler 5. After decomposition, a valve 11 provided under the reaction vessel 1 is opened to separate an unreactive substance and a filler such as glass fiber by a centrifugal separator 12. The decomposed liquid is fed to a tank 13 by a pump 17, to be employed for re-synthesis. In the re-synthesis, water is distilled away through a partial condenser 21, to prevent glycol from distillation. Re-synthesized resin is stored in a tank 19.

Such a stainless reaction vessel is resistant against alkali as compared with a glass reaction vessel, and can be used at a higher temperature. Further, the same can be also used under pressure. In addition, the torque of stirring is so high that the ratio of the waste to the composition component can be increased.

Further, the waste can be treated at a temperature exceeding the boiling point of dicarboxylic acid or diamine by employing a pressure reaction vessel, whereby the decomposition rate can be increased.

According to the present invention, industrially useful resin raw material can be obtained from cured unsaturated polyester resin waste. Further, decomposition Products produced with a dicarboxylic acid or a diamine for obtaining such resin raw material can be performed at a relatively low temperature through a relatively simple operation, whereby cured unsaturated polyester resin waste can be recycled with relatively simple equipment.

According to the present invention, further, the decomposition rate can be promoted by decomposing cured unsaturated polyester resin waste at a high temperature under high pressure. Namely, the reaction can be conducted under pressure with a decomposition component having a low boiling point at a temperature exceeding this boiling point. The reaction vessel is preferably sealed for conducting the reaction under pressure, in consideration of the prevention of oxidation.

On the other hand, an apparatus for decomposing and recycling unsaturated polyester resin waste for carrying out the present invention preferably comprises a stainless reaction vessel. Such a stainless reaction vessel is resistant against alkali as compared with a glass reaction vessel, and can be used at a higher temperature. Further, the stainless reaction vessel has high torque of stirring, whereby the ratio of the amount of the unsaturated polestar resin waste to that of the decomposition component can be increased.

In the apparatus for decomposing and recycling cured unsaturated polyester resin waste, further, the reaction vessel is preferably sealable and operable under pressure. When the reaction vessel is used under pressure, the waste can be treated at a temperature exceeding the boiling point of the employed decomposition component, to effectively facilitate decomposition.

According to the inventive method of recycling cured unsaturated polyester resin waste, it is possible to decompose waste resin at a low temperature of about 200 to 300° C. for reacting the same as resin raw material, thereby regenerating unsaturated polyester resin. Glass fiber which is contained in waste FRP is not deteriorated in this of temperature, range and hence the same can be reused.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

With reference to Examples, the present invention is now described in more concrete terms.

In the following Examples, powder samples were prepared by crushing chips of buttons consisting of unsaturated polyester resin into 3 mm in grain size with a rotary cutter mill (Granulaters U-140 by HORAI CO., LTD.) and further into 100 meshes with a high-speed hammer mill by Yoshida Seisakusho Co., Ltd.

Button shavings were employed for decomposition as such.

(Example 1)
Decomposition with Dicarboxylic Acid 2 g of cured unsaturated polyester resin waste, 20 g of adipic acid and 0.2 g of sodium hydroxide were introduced into TVS-N2 (cap bolt system) by Taiatsu Corporation, and treated at 280° C. for 3 hours. The gauge pressure was 2.0 kgf/cm$^2$. After reaction, the mixture was neutralized with hydrochloric acid, filtered, washed with methanol, acetone, water and THF (tetrahydrofuran), and dried. The amount of residual resin as filtered off was 0.0392 g, and the decomposition ratio was 98.0%.

A THF solution was prepared from the decomposition product, and the molecular weights were measured by gel permeation chromatography (GPC) on the basis of standard polystyrene. Consequently, the number-average molecular weight was 525, the weight-average molecular weight was 544, and the ratio of the weight-average molecular weight to the number-average molecular weight was 1.04 at a peak 1 of the decomposition product. On the other hand, the number-average molecular weight was 221, the weight-average molecular weight was 229, and the ratio of the weight-average molecular weight to the number-average molecular weight was 1.04 at a peak 2 of the decomposition product. At the total peak of the decomposition product, the number-average molecular weight was 233, the weight-average molecular weight was 258, and the ratio of the weight-average molecular weight to the number-average molecular weight was 1.11.

(Example 2)
Decomposition with Dicarboxylic Acid Ester 2 g of cured unsaturated polyester resin waste, 20 g of dimethyl fumarate and 0.2 g of sodium acetate were introduced into TVS-N2 (cap bolt system) by Taiatsu Corporation, and treated at 290° C. for 2 hours. The gauge pressure was 11.1 kgf/cm$^2$. After reaction, the mixture was filtered, washed with methanol, acetone, water and THF, and dried. The amount of residual resin as filtered off was 1.0083 g, and the decomposition ratio was 49.6%.

The molecular weights of the decomposition product were measured by GPC, similarly to Example 1. Consequently, the number-average molecular weight was 590, the weight-average molecular weight was 836, and the ratio of the weight-average molecular weight to the number-average molecular weight was 1.42 at a peak 1 of the decomposition product. On the other hand, the number-average molecular weight was 167, the weight-average molecular weight was 169, and the ratio of the weight-average molecular weight to the number-average molecular weight was 1.01 at a peak 2 of the decomposition product. At the total peak of the decomposition product, the number-average molecular weight was 575, the weight-average molecular weight was 829, and the ratio of the weight-average molecular weight to the number-average molecular weight was 1.44.

(Example 3)
Decomposition with Dicarboxylic Acid Ester 2 of cured unsaturated polyester resin waste, 20 g of diethyl maleate and 0.2 g of calcium acetate were introduced into TVS-N2 (cap bolt system) by Taiatsu Corporation, and treated at 250° C. for 5 hours. The gauge pressure was 0.5 kgf/cm$^2$. After reaction, the mixture was filtered, washed with methanol, acetone, water and THF, and dried. The amount of residual resin as filtered off was 1.6590 g, and the decomposition ratio was 17.1%.

The molecular weights of the decomposition product were measured by GPC, similarly to Example 1. Consequently, the number-average molecular weight was 635, the weight-average molecular weight was 772, and the ratio of the weight-average molecular weight to the number-average molecular weight was 1.22 at a peak 1 of the decomposition product. On the other hand, the number-average molecular weight was 324, the weight-average molecular weight was 327, and the ratio of the weight-average molecular weight to the number-average molecular weight was 1.01 at a peak 2 of the decomposition product. At the total peak of the decomposition product, the number-average molecular weight was 393, the weight-average molecular weight was 539, and the ratio of the weight-average molecular weight to the number-average molecular weight was 1.37.

(Example 4)
Decomposition with Diamine 2 of cured unsaturated polyester resin waste, 20 g of diethylenetriamine and 0.2 g of sodium hydroxide were introduced into TVS-N2 (cap-bolt system) by Taiatsu Corporation, and treated at 250 20 C. for 5 hours. The gauge pressure was 2.0 kgf/cm². After reaction, the mixture was neutralized with hydrochloric acid, filtered, washed with THF, water and methanol, and dried. The amount of residual resin as filtered off was 0.1171 g, and the decomposition ratio was 94.1%.

The molecular weights of the decomposition product were measured by GPC, similarly to Example 1. Consequently, the number-average molecular weight was 761, the weight-average molecular weight was 814, and the ratio of the weight-average molecular weight to the number-average molecular weight was 1.07 at a peak 1 of the decomposition product. On the other hand, the number-average molecular weight was 317, the weight-average molecular weight was 340, and the ratio of the weight-average molecular weight to the number-average molecular weight was 1.07 at a peak 2 of the decomposition product. Further, the number-average molecular weight was 133, the weight-average molecular weight was 136, and the ratio of the weight-average molecular weight to the number-average molecular weight was 1.02 at a peak 3 of the decomposition product. At the total peak of the decomposition product, the number-average molecular weight was 337, the weight-average molecular weight was 510, and the ratio of the weight-average molecular weight to the number-average molecular weight was 1.51.

(Example 5)
Decomposition with Bisphenol 2 of cured unsaturated polyester resin waste, 20 g of 4,4-dihydroxydiphenylsulfone and 0.2 g of sodium hydroxide were introduced into TVS-N2 (cap bolt system) by Taiatsu Corporation, and treated at 280 20 C. for 3 hours. The gauge pressure was 0.6 kgf/cm². After reaction, the mixture was neutralized with hydrochloric acid, filtered, washed with methanol, acetone, water and THF, and dried. The amount of residual resin as filtered off was 0.0579 g, and the decomposition ratio was 97.1%.

The molecular weights of the decomposition product were measured by GPC, similarly to Example 1. Consequently, the number-average molecular weight was 663, the weight-average molecular weight was 689, and the ratio of the weight-average molecular weight to the number-average molecular weight was 1.04 at a peak 1 of the decomposition product. On the other hand, the number-average molecular weight was 294, the weight-average molecular weight was 304, and the ratio of the weight-average molecular weight to the number-average molecular weight was 1.03 at a peak 2 of the decomposition product. At the total peak of the decomposition product, the number-average molecular weight was 310, the weight-average molecular weight was 340, and the ratio of the weight-average molecular weight to the number-average molecular weight was 1.10.

(Example 6)
Decomposition with Dihydric Phenol 2 of cured unsaturated polyester resin waste, 20 g of hydroquinone and 0.2 g of sodium hydroxide were introduced into TVS-N2 (cap bolt system) by Taiatsu Corporation, and treated at 280 20 C. for 3 hours. The gauge pressure was 1.5 kgf/cm². After reaction, the mixture was neutralized with hydrochloric acid, filtered, washed with methanol, acetone, water and THF, and dried. The amount of residual resin as filtered off was 0.0016 g, and the decomposition ratio was 99.9%.

The molecular weights of the obtained decomposition product were measured by GPC, similarly to Example 1. Consequently, the number-average molecular weight was 681, the weight-average molecular weight was 849, and the ratio of the weight-average molecular weight to the number-average molecular weight was 1.24 at a peak 1 of the decomposition product. On the other hand, the number-average molecular weight was 303, the weight-average molecular weight was 309, and the ratio of the weight-average molecular weight to the number-average molecular weight was 1.02 at a peak 2 of the decomposition product. Further, the number-average molecular weight was 148, the weight-average molecular weight was 152, and the ratio of the weight-average molecular weight to the number-average molecular weight was 1.03 at a peak 3 of the decomposition product. At the total peak of the decomposition product, the number-average molecular weight was 218,the weight-average molecular weight was 384, and the ratio of the weight-average molecular weight to the number-average molecular weight was 1.76.

(Example 7)
Decomposition with Dithiol 2 of cured unsaturated polyester resin waste, 20g of 1,2-ethanedithiol and 0.2 g of potassium hydroxide were introduced into TVS-N2 (cap bolt system) by Taiatsu Corporation, and treated at 200° C. for 3 hours. The gauge pressure was 3.5 kgf/cm². After reaction, the mixture was neutralized with hydrochloric acid, filtered, washed with methanol, acetone, water and THF, and dried. The amount of residual resin as filtered off was 1.6626 g, and the decomposition ratio was 16.9%.

The molecular weights of the obtained decomposition product were measured by GPC, similarly to Example 1. Consequently, the number-average molecular weight was 174, the weight-average molecular weight was 220, and the ratio of the weight-average molecular weight to the number-average molecular weight was 1.27 in the decomposition product.

(Example 8)
Decomposition with Amino Alcohol 2 of cured unsaturated polyester resin waste and 20 g of 2-aminoethanol were introduced into TVS-N2 (cap bolt system) by Taiatsu Corporation, and treated at 280° C. for 3 hours. The gauge pressure was 7.9 kgf/cm². After reaction, the mixture was filtered, washed with methanol and THF, and dried. The amount of residual resin as filtered off was 0.0031 g, and the decomposition ratio was 99.8%.

The molecular weights of the obtained decomposition product were measured by GPC, similarly to Example 1.

Consequently, the number-average molecular weight was 141, the weight-average molecular weight was 152, and the ratio of the weight-average molecular weight to the number-average molecular weight was 1.08 in the decomposition product.

(Example 9)
Decomposition with Monocarboxylic Acid Ester 2 of cured unsaturated polyester resin waste, 20 g of ethyl benzoate and 0.2 g of zinc acetate were introduced into TVS-N2 (cap bolt system) by Taiatsu Corporation, and treated at 280° C. for 3 hours. The gauge pressure was 1.4 kgf/cm$^2$. After reaction, the mixture was filtered, washed with methanol, acetone, water and THF, and dried. The amount of residual resin as filtered off was 1.2874 g, and the decomposition ratio was 35.6%.

The molecular weights of the obtained decomposition product were measured by GPC, similarly to Example 1. Consequently, the number-average molecular weight was 191, the weight-average molecular weight was 250, and the ratio of the weight-average molecular weight to the number-average molecular weight was 1.31 in the decomposition product.

(Example 10)
Decomposition with Monoalcohol 2 of cured unsaturated polyester resin waste, 20 g of ethanol and 0.2 g of sodium ethylate were introduced into TVS-N2 (cap bolt system) by Taiatsu Corporation, and treated at 200° C. for 3 hours. The gauge pressure was 5.1 kgf/cm$^2$. After reaction, the mixture was neutralized with hydrochloric acid, filtered, washed with methanol, acetone, water and THF, and dried. The amount of residual resin as filtered off was 1.6725 g, and the decomposition ratio was 16.4%.

The molecular weights of the obtained decomposition product were measured by GPC, similarly to Example 1. Consequently, the number-average molecular weight was 947, the weight-average molecular weight was 1.236, and the ratio of the weight-average molecular weight to the number-average molecular weight was 1.31 at a peak 1 of the decomposition product. On the other hand, the number-average molecular weight was 438, the weight-average molecular weight was 443, and the ratio of the weight-average molecular weight to the number-average molecular weight was 1.01 at a peak 2 of the decomposition product. Further, the number-average molecular weight was 300, the weight-average molecular weight was 304, and the ratio of the weight-average molecular weight to the number-average molecular weight was 1.01 at a peak 3 of the decomposition product. In addition, the number-average molecular weight was 157, the weight-average molecular weight was 165, and the ratio of the weight-average molecular weight to the number-average molecular weight was 1.05 at a peak 4 of the decomposition product. At the total peak of the decomposition product, the number-average molecular weight was 228, the weight-average molecular weight was 475, and the ratio of the weight-average molecular weight to the number-average molecular weight was 2.08.

(Example 11)
Decomposition with Monophenol 2 of cured unsaturated polyester resin waste, 10 g of phenol and 0.1 g of NaOH were introduced into TVS-N2 (cap bolt system) by Taiatsu Corporation, and treated at 250° C. for 5 hours. The gauge pressure was 1.1 kgf/cm$^2$. After reaction, the mixture was neutralized with hydrochloric acid, filtered, washed with methanol, acetone, water and THF, and dried. The amount of residual resin as filtered off was 1.0383 g, and the decomposition ratio was 48.1%.

The molecular weights of the obtained decomposition product were measured by GPC, similarly to Example 1. Consequently, the number-average molecular weight was 452, the weight-average molecular weight was 511, and the ratio of the weight-average molecular weight to the number-average molecular weight was 1.13 at a peak 1 of the decomposition product. On the other hand, the number-average molecular weight was 225, the weight-average molecular weight was 228, and the ratio of the weight-average molecular weight to the number-average molecular weight was 1.01 at a peak 2 of the decomposition product. At the total peak of the decomposition product, the number-average molecular weight was 359, the weight-average molecular weight was 425, and the ratio of the weight-average molecular weight to the number-average molecular weight was 1.18.

(Example 12)
Decomposition with Water 2 g of cured unsaturated polyester resin waste, 20 g of water and 0.2 of NaOH were introduced into TVS-N2 (cap bolt system) by Taiatsu Corporation, and treated at 200° C. for 3 hours. The gauge pressure was 4.9 kgf/cm$^2$. After reaction, the mixture was neutralized with hydrochloric acid, filtered, washed with methanol, acetone, water and THF, and dried. The amount of residual resin as filtered off was 1.5087 g, and the decomposition ratio was 24.6%.

The molecular weights of the obtained decomposition product were measured by GPC, similarly to Example 1. Consequently, the number-average molecular weight was 423, the weight-average molecular weight was 426, and the ratio of the weight-average molecular weight to the number-average molecular weight was 1.01 at a peak 1 of the decomposition product. On the other hand, the number-average molecular weight was 284, the weight-average molecular weight was 287, and the ratio of the weight-average molecular weight to the number-average molecular weight was 1.01 at a peak 2 of the decomposition product. Further, the number-average molecular weight was 125, the weight-average molecular weight was 132, and the ratio of the weight-average molecular weight to the number-average molecular weight was 1.05 at a peak 3 of the decomposition product. At the total peak of the decomposition product, the number-average molecular weight was 154, the weight-average molecular weight was 201, and the ratio of the weight-average molecular weight to the number-average molecular weight was 1.31.

(Example 13)
Decomposition with Glycol Ester 2 g of FRP (fiberglass reinforced plastic), 20 of 1,2-diacetoxyethane and 0.1 g of antimony oxide (III) were introduced into TVS-N2 (cap bolt system) by Taiatsu Corporation, and treated at 280° C. for 3 hours. The gauge pressure was 2.2 kgf/cm$^2$. After reaction, the mixture was filtered, washed with methanol, acetone, water and THF, and dried. The amount of residual resin as filtered off was 1.5542 g, and the decomposition ratio was 27.3%.

The molecular weights of the obtained decomposition product were measured by GPC, similarly to Example 1. Consequently, the number-average molecular weight was 548, the weight-average molecular weight was 608, and the ratio of the weight-average molecular weight to the number-average molecular weight was 1.04 at a peak 1 of the decomposition product. On the other hand, the number-average molecular weight was 307, the weight-average molecular weight was 319, and the ratio of the weight-average molecular weight to the number-average molecular weight was 1.04 at a peak 2 of the decomposition product. At the total peak of the decomposition product, the number-average molecular weight was 320, the weight-average molecular weight was 341, and the ratio of the weight-average molecular weight to the number-average molecular weight was 1.07.

(Example 14)
Synthesis of Regenerated Unsaturated Polyester Resin 21.2 g of propylene glycol, 0.025 g of catalytic calcium acetate and 0.01 g of antimony trioxide were added to 20.9 g of the decomposition product through dimethyl fumarate obtained in Example 2, and the mixture was heated under a nitrogen jet at 180° C. for 1 hour and at 200° C. for 2 hours. Thereafter methanol was distilled away, then the temperature was increased to 220° C. to distill unreacted propylene glycol, and the mixture was heated at this temperature for 3 hours. Consequently, unsaturated polyester resin was obtained.

(Example 15)
Synthesis of Regenerated Polyurethane 21.9 g of the decomposition product through bisphenol S obtained in Example 5 was introduced into 100 ml of anisole anhydride and boiled, and then 100 ml of an anisole anhydride solution of 11.2 g of tetramethylene diisocyanate was dropped into the same. Thereafter the mixture was continuously refluxed for 6 hours, cooled and filtered, to obtain polyurethane.

(Example 16)
Synthesis of Regenerated Polyurea 21.8 g of the decomposition product through diethylenetriamine obtained in Example 4 was introduced into 100 ml of anisole anhydride, and the mixture was stirred under cooling with ice, so that 200 ml of an anisole anhydride solution of 38 g of octamethylene diisocyanate was dropped into the same. Polyurea was immediately precipitated. Thereafter reaction was made at 150° C. for 3.5 hours and the reactant was filtered, to obtain polyurea.

(Example 17)
Synthesis of Regenerated Polyamide 16.1 g of hexamethylenediamine was added to 21.9 g of the decomposition product through adipic acid obtained in Example 1, and the mixture was heated under a nitrogen atmosphere at 220° C. for 1 hour and at 270° C. for 3 hours, to obtain polyamide. On the other hand, 28.3 g of adipic acid was added to 21.8 g of the diethylenetriamine decomposition product obtained in Example 4 and the mixture was similarly heated, to obtain polyamide.

(Example 18)
Synthesis of Regenerated Epoxy Resin 145.8 g of Epikote 828 (bisphenol A - epichlorohydrin epoxy resin of 188 g/eq. in epoxy equivalent by Yuka Shell Epoxy Kabushiki Kaisha) was added to 21.8 of the decomposition product through diethylenetriamine obtained in Example 4, mixed, thereafter deaired, and precured at 80° C. for 4 hours. Thereafter the mixture was postcured at 150° C. for 4 hours, to obtain regenerated epoxy resin.

(Example 19)
Synthesis of Regenerated Phenol Resin 7.8 g of 37% aqueous formaldehyde and 0.1 ml of 35% hydrochloric acid serving as a catalyst were added to 21.9 g of the decomposition product through 4,4'dihydroxydiphenylsulfone obtained in Example 5, and the mixture was heated to 85° C. with stirring, and refluxed for 1.5 hours. After reaction, the reactant was introduced into an evaporating dish, and heated to 170° C. Obtained novolak resin was cooled and thereafter crushed, while 2.5 g of hexamethylene tetramine was added thereto and the mixture was compression-molded at 140° C. for 10 minutes, to obtain a molding of phenol resin. When caustic soda was employed as a catalyst, resol resin was obtained.

Examples employing a stainless apparatus are now described.

FIG. 1 schematically illustrates the structure of an exemplary recycling apparatus for cured unsaturated polyester resin waste for carrying out the present invention.

Referring to FIG. 1, this apparatus comprises a sealable stainless 100L reaction vessel 1, a first tank 2 storing a decomposition component to be injected into the reaction vessel 1, a second tank 3 storing a catalyst such as sodium hydroxide to be injected into the reaction vessel 1, and a third tank 4 for storing cured unsaturated polyester resin waste to be injected into the reaction vessel 1.

Further, a heat medium boiler 5 for heating and cooling the reaction vessel 1 and a stirrer 6 which is rotated by a motor 20 for stirring a reacted liquid in the reaction vessel 1 are mounted on the reaction vessel 1.

In addition, the reaction vessel 1 is provided with a cooler 7 for liquefying volatile components which are generated from the reaction vessel 1, and a receiver 8 for receiving the liquid resulting from liquefaction by the cooler 7.

Figure 2:
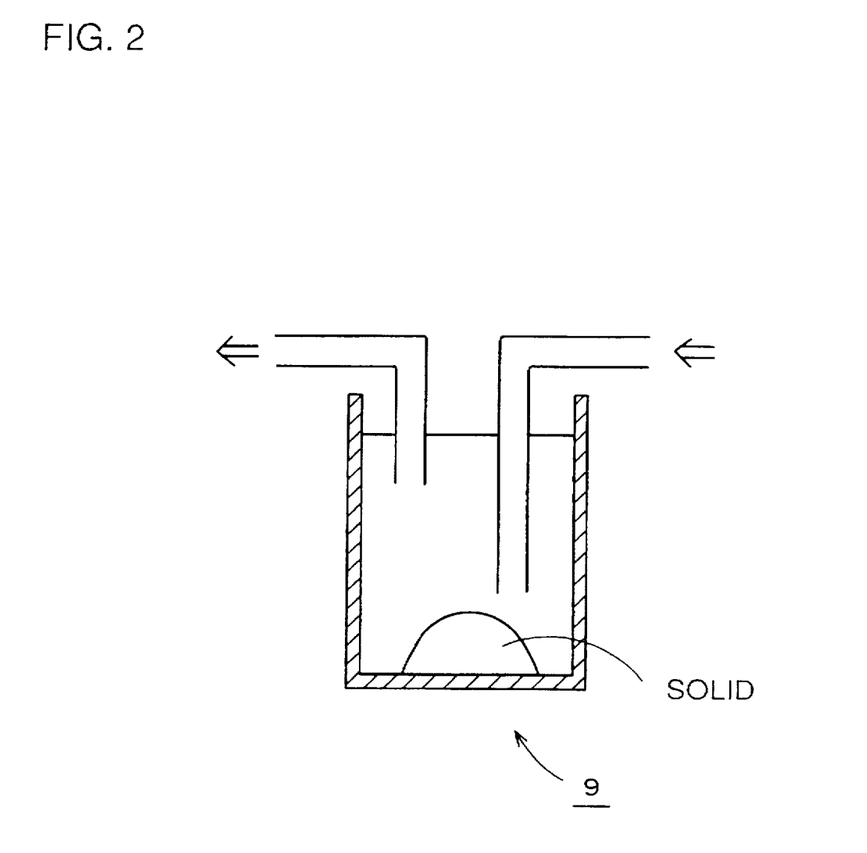
FIG. 2 is adapted to illustrate a trap of the apparatus shown in FIG. 1.

The volatile components generated from the reaction vessel 1 include a sublimable component such as phthalic acid, which may solidify and block a tube part of the cooler 7 when the same is directly fed into the cooler 7. Therefore, this apparatus is provided with a trap 9 on a path leading from the reaction vessel 1 to the cooler 7. This trap 9 is structured as shown in FIG. 2, and 15 for removing the sublimable component such as phthalic acid.

Further, the reaction vessel 1 is provided on its lower portion with an outlet port 10 for taking out the decomposed liquid resulting from THE decomposition reaction in the reaction vessel 1.

This apparatus further comprises a centrifugal separator 12 for removing an unreactive substance and a filler such as glass fiber from the decomposed liquid which is taken out from the outlet port 10.

In addition, this apparatus comprises a fourth tank 13 for storing the decomposed liquid from which precipitates are removed by centrifugation for injecting the same into the reaction vessel 1 again for re-synthetic reaction, fifth, sixth and seventh tanks 14, 15 and 16 for storing components, which are required for re-synthesis, to be injected into the reaction vessel 1, a nitrogen inlet tube 18 for introducing nitrogen gas into the reaction vessel 1 which is in the process of re-synthetic reaction, and a partial condenser 21 for distilling away water thereby preventing glycol from distillation.

With the recycling apparatus having the aforementioned structure, cured unsaturated polyester resin waste is decomposed and re-synthesized as follows:

First, a decomposition component is injected into the reaction vessel 1 from the first tank 2, and cooling water is fed to drive the cooler 7. Volatile components which are generated during reaction are liquefied by the cooler 7, and stored in the receiver 8. The liquid stored in the receiver 8 is properly returned into the reaction vessel 1. A sublimable component such as phthalic acid is previously removed by the trap 9 before reaching the cooler 7.

Then, the stirrer 6 is rotated by the motor 20, to start stirring the solution in the reaction vessel 1. Then, sodium hydroxide is injected into the reaction vessel 1 from the second tank 3 as a catalyst, and thereafter the reaction vessel 1 is heated by the heat medium boiler 5. Then, unsaturated polyester resin waste is introduced into the reaction vessel 1 from the third vessel 3, for the decomposition reaction.

After completion of the decomposition reaction, the heat medium boiler 5 is switched to cool the reaction vessel 1 to a prescribed temperature. Then, the valve 11 is opened to take out the decomposed liquid from the reaction vessel 1 through the outlet port 10. The decomposed liquid is centrifugally separated by the centrifugal separator 12 so that precipitates are removed from the same, and then fed to the fourth tank 13 through a pump 17.

The decomposed liquid obtained by the aforementioned decomposition reaction is then injected into the reaction vessel 1 again for re-synthetic reaction.

Then, maleic anhydride and propylene glycol are injected into the reaction vessel 1 from the fifth and sixth tanks 14 and 15 respectively as re-synthesis components, for example. Then, the reaction vessel 1 is heated by the heat medium boiler 5, to conduct the re-synthesis reaction. In the re-synthethesis reaction, nitrogen gas is introduced from the nitrogen inlet tube 18, the valve 11 is switched to use the partial condenser 21, and the reaction solution is stirred by the stirrer 6.

After the reaction, the reacted liquid is cooled and thereafter styrene, for example, is injected into the reaction vessel 1 from the seventh tank 16, for obtaining regenerated unsaturated polyester resin. This regenerated resin is stored in a tank 19.

Examples carrying out decomposition and re-synthesis of cured unsaturated polyester resin waste with the aforementioned apparatus are now described.

(Example 20)
Decomposition in Stainless Apparatus with Dicarboxylic Acid 40 kg of adipic acid was introduced into the stainless 100 L reaction vessel 1 from the chemical injection tank 2, cooling water was fed from the condenser 7, and the stirrer 6 was driven to start stirring at 24 rpm. Then, 60 g of caustic soda was introduced from the chemical injection tank 3, and the temperature was increased by the heat medium boiler 5. Then, 20 kg of unsaturated polyester button shavings were introduced from the tank 4. The temperature was heated to 280° C., and thereafter the mixture was treated for 3 hours. The decomposition product was neutralized with acetic acid, and the valve 11 provided under the reaction vessel 1 was opened to obtain 60 kg of the decomposition product. The decomposition ratio was 100%.

(Example 21)
Re-synthesis of Unsaturated Polyester Resin in Stainless Apparatus 30 kg of the decomposition product produced with adipic acid obtained in Example 20 was introduced into the reaction vessel 1 from the chemical injection tank 13, then 8.9 kg of maleic anhydride was added from the chemical injection tank 14 with addition of 17.4 kg of propylene glycol from the chemical injection tank 15, nitrogen was fed from the nitrogen inlet tube 18 at 60 L/h., and the mixture was stirred at 84 rpm, heated and reacted at 210° C. for 4 hours while distilling away water through the partial condenser 21. Thereafter the mixture was cooled, and 3.7 g of hydroquinone and 22.4 kg of styrene were added from the chemical injection tank 16, to obtain 74.6 kg of regenerated unsaturated polyester resin.

In relation to decomposition of unsaturated polyester resin, literature (International Laying-open No. W094/25517) discloses a technique of decomposing unsaturated polyester resin with glycol, for example. In the aforementioned Examples, however, the samples were decomposed with dicarboxylic acid, diamine, bisphenol derivative, dithiol, amino alcohol and monoalcohol at higher rates than that decomposed with glycol. For the purpose of comparison, experimental results as to decomposition with glycol are now described.

(Comparative Example 1)
Decomposition with Ethylene Glycol 2 of cured unsaturated polyester resin waste, 20 g of ethylene glycol and 0.2 g of NaOH were introduced into TVS-N2 (cap bolt system) by Taiatsu Corporation, and treated at 250° C. for 5 hours. After reaction, the mixture was neutralized with hydrochloric acid, filtered, washed with water and THF, and dried. The amount of residual resin as filtered off was 0.7638 g, and the decomposition ratio was 61.6%.

The molecular weights of the obtained decomposition product were measured by GPC, similarly to Example 1. Consequently, the number-average molecular weight was 269, the weight-average molecular weight was 334, and the ratio of the weight-average molecular weight to the number-average molecular weight was 1.24 at a peak 1 of the decomposition product. On the other hand, the number-average molecular weight was 229, the weight-average molecular weight was 231, and the ratio of the weight-average molecular weight to the number-average molecular weight was 1.01 at a peak 2 of the decomposition product. Further, the number-average molecular weight was 141, the weight-average molecular weight was 145, and the ratio of the weight-average molecular weight to the number-average molecular weight was 1.03 at a peak 3 of the decomposition product. At the total peak of the decomposition product, the number-average molecular weight was 182, the weight-average molecular weight was 253, and the ratio of the weight-average molecular weight to the number-average molecular weight was 1.39.

(Comparative Example 2)
Decomposition with Ethylene Glycol 2 of cured unsaturated polyester resin waste, 20 g of ethylene glycol and 0.2 g of NaOH were introduced into TVS-N2 (cap bolt system) by Taiatsu Corporation, and treated at 280° C. for 3 hours. After reaction, the mixture was neutralized with hydrochloric acid, filtered, washed with water and THF, and dried. The amount of residual resin as filtered off was 0.7213 g, and the decomposition ratio was 63.94%.

(Comparative Example 3)
Decomposition with Ethylene Glycol 2 of cured unsaturated polyester resin waste, 20 g of ethylene glycol and 0.2 g of NaOH were introduced into TVS-N2 (cap bolt system) by Taiatsu Corporation, and treated at 290° C. for 3 hours. After reaction, the mixture was neutralized with hydrochloric acid, filtered, washed with water and THF, and dried. The amount of residual resin as filtered off was 0.4891 g, and the decomposition ratio was 75.55%.

The molecular weights of the obtained decomposition product were measured by GPC, similarly to Example 1. Consequently, the number-average molecular weight was 235, the weight-average molecular weight was 237, and the ratio of the weight-average molecular weight to the number-average molecular weight was 1.01 at a peak 1 of the decomposition product. On the other hand, the number-average molecular weight was 156, the weight-average molecular weight was 159, and the ratio of the weight-average molecular weight to the number-average molecular weight was 1.02 at a peak 2 of the decomposition product. At the total peak of the decomposition product, the number-average molecular weight was 156, the weight-average molecular weight was 165, and the ratio of the weight-average molecular weight to the number-average molecular weight was 1.06.

(Comparative Example 4)
Decomposition with Ethylene Glycol 10 g of cured unsaturated polyester resin waste, 40 g of ethylene glycol and 2 of NaOH were introduced into a 1L three-necked round bottom flask provided with a cooler, and treated at 200° C. for 9 hours. After reaction, the mixture was neutralized with hydrochloric acid, filtered, washed with water and THF, and dried. The amount of residual resin as filtered off was 4.2357 g, and the decomposition ratio was 47.64%.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of recycling cured unsaturated polyester resin waste, comprising the step of decomposing said cured unsaturated polyester resin waste with at least one component being selected from the group of consisting of saturated dicarboxylic acid, unsaturated dicarboxylic acid, saturated dicarboxylic acid alkyl ester, saturated dicarboxylic acid aryl ester, unsaturated dicarboxylic acid alkyl ester, unsaturated dicarboxylic acid aryl ester, diamine, bisphenol derivative, bisphenol derivative ester, dihydric phenol, dihydric phenol ester, dithiol, dithiol ester, amino alcohol, amino alcohol ester, aminocarboxylic acid, aminocarboxylic acid alkyl ester, aminocarboxylic acid aryl ester, aminophenol, aminophenol ester, hydroxycarboxylic acid, hydroxycarboxylic acid ester, mercaptocarboxylic acid, mercaptocarboxylic acid ester, monocarboxylic acid, monocarboxylic acid ester, monoalcohol, monoalcohol ester, monophenol, monophenol ester, monothiol, monothiol ester, water and glycol ester thereby obtaining resin raw material.

2. The method of recycling cured unsaturated polyester resin waste in accordance with claim 1, wherein said decomposition is performed under pressure.

3. The method of recycling cured unsaturated polyester resin waste in accordance with claim 1, further comprising the steps of:

reacting said resin raw material with unsaturated dibasic acid and glycol for obtaining regenerated unsaturated polyester resin when the same is a decomposition product through at least one component being selected from the group of consisting of saturated dicarboxylic acid and saturated dicarboxylic acid ester, reacting said resin raw material with glycol for obtaining regenerated unsaturated polyester resin when the same is a decomposition product through at least one component being selected from the group of consisting of unsaturated dicarboxylic acid and unsaturated dicarboxylic acid ester, reacting said resin raw material with unsaturated dibasic acid for obtaining regenerated unsaturated polyester resin when the same is a decomposition product through at least one component being selected from the group of consisting of diamine, bisphenol derivative, bisphenol derivative ester, dihydric phenol, dihydric phenol ester, dithiol, dithiol ester, amino alcohol, amino alcohol ester, aminophenol, aminophenol ester and glycol ester, reacting said resin raw material with unsaturated dibasic acid and glycol for obtaining regenerated unsaturated polyester resin when the same is a decomposition product through at least one component being selected from the group of consisting of aminocarboxylic acid, aminocarboxylic acid ester, hydroxycarboxylic acid, hydroxycarboxylic acid ester, mercaptocarboxylic acid and mercaptocarboxylic acid ester, or reacting said resin raw material with unsaturated dibasic acid and glycol for obtaining regenerated unsaturated polyester resin when the same is a decomposition product through at least one component being selected from the group of consisting of monocarboxylic acid, monocarboxylic acid ester, monoalcohol, monoalcohol ester, monophenol, monophenol ester, monothiol, monothiol ester and water after removing unreacted excess said at least one component being selected from said group of consisting of monocarboxylic acid, monocarboxylic acid ester, monoalcohol, monoalcohol ester, monophenol, monophenol ester, monothiol, monothiol ester and water, and cross-linking said regenerated unsaturated polyester resin by at least one component being selected from the group of consisting of styrene, methyl methacrylate, vinyl toluene, vinyl acetate and diallyl phthalate under the presence of a polymerization initiator, thereby obtaining cured unsaturated polyester resin.

4. The method of recycling cured unsaturated polyester resin waste in accordance with claim 3, wherein said unsaturated dibasic acid being employed for said reaction is a decomposition product of said cured unsaturated polyester resin waste through at least one component being selected from said group of consisting of unsaturated dicarboxylic acid and unsaturated dicarboxylic acid ester, said saturated dibasic acid is a decomposition of said cured unsaturated polyester resin waste through at least one component being selected from said group consisting of saturated dicarboxylic acid and saturated dicarboxylic acid ester, and said glycol is a decomposition product of said cured unsaturated polyester resin waste through at least one component being selected from the group of consisting of diamine, bisphenol, dihydric phenol, dithiol, bisphenol ester, dihydric phenol ester and dithiol ester.

5. The method of recycling cured unsaturated polyester resin waste in accordance with claim 1, further comprising the steps of:

reacting said resin raw material with unsaturated dibasic acid and glycol for obtaining regenerated unsaturated polyester resin when the same is a decomposition product through at least one component being selected from the group of consisting of saturated dicarboxylic acid and saturated dicarboxylic acid ester, reacting said resin raw material with glycol and saturated dibasic acid for obtaining regenerated unsaturated polyester resin when the same is a decomposition product through at least one component being selected from the group of consisting of unsaturated dicarboxylic acid and unsaturated dicarboxylic acid ester, reacting said resin raw material with unsaturated dibasic acid and saturated dibasic acid for obtaining regenerated unsaturated polyester resin when the same is a decomposition product through at least one component being selected from the group of consisting of diamine, bisphenol derivative, bisphenol derivative ester, dihydric phenol, dihydric phenol ester, dithiol, dithiol ester, amino alcohol, amino alcohol ester, aminophenol, aminophenol ester and glycol ester, reacting said resin raw material with unsaturated dibasic acid and glycol for obtaining regenerated unsaturated polyester resin when the same is a decomposition product through at least one component being selected from the group of consisting of aminocarboxylic acid, aminocarboxylic acid ester, hydroxycarboxylic acid, hydroxycarboxylic acid ester, mercaptocarboxylic acid and mercaptocarboxylic acid ester, or reacting said resin raw material with unsaturated dibasic acid, glycol and saturated dibasic acid when the same is a decomposition product through at least one component being selected from the group of consisting of monocarboxylic acid, monocarboxylic acid ester, monoalcohol, monoalcohol ester, monophenol, monophenol ester, monothiol, monothiol ester and water after removing unreacted excess said at least one component being selected from said group of consisting of monocarboxylic acid, monocarboxylic acid ester, monoalcohol, monoalcohol ester, monophenol, monophenol ester, monothiol, monothiol ester and water, and cross-linking said regenerated unsaturated polyester resin by at least one component being selected from the group of consisting of styrene, methyl methacrylate, vinyl toluene, vinyl acetate and diallyl phthalate under the presence of a polymerization initiator, thereby obtaining cured unsaturated polyester resin.

6. The method of recycling cured unsaturated polyester resin waste in accordance with claim 5, wherein said unsaturated dibasic acid being employed for said reaction is a decomposition product of said cured unsaturated polyester resin component through at least one component being selected from said group of consisting of unsaturated dicarboxylic acid and unsaturated dicarboxylic acid ester, said saturated dibasic acid is a decomposition of said cured unsaturated polyester resin waste through at least one component being selected from said group of consisting of saturated dicarboxylic acid and saturated dicarboxylic acid ester, and said glycol is a decomposition product of said cured unsaturated polyester resin waste through at least one component being selected from the group of consisting of diamine, bisphenol, dihydric phenol, dithiol, bisphenol ester, dihydric phenol ester and dithiol ester.

7. The method of recycling cured unsaturated polyester resin waste in accordance with claim 1, further comprising a step of reacting a decomposition product of said cured unsaturated polyester resin waste through at least one component being selected from the group of consisting of bisphenol, dihydric phenol, dithiol, amino alcohol and aminophenol with diisocyanate for obtaining regenerated polyurethane.

8. The method of recycling cured unsaturated polyester resin waste in accordance with claim 1, wherein said cured unsaturated polyester resin is FRP.

9. The method of recycling cured unsaturated polyester resin waste in accordance with claim 1, further comprising a step of reacting a decomposition product of said cured unsaturated polyester resin waste through diamine with at least one component being selected from the group of consisting of dicarboxylic acid, dicarboxylic acid chloride and dicarboxylic acid ester for synthesizing regenerated polyamide.

10. The method of recycling cured unsaturated polyester resin waste in accordance with claim 1, further comprising a step of reacting a decomposition product of said cured unsaturated polyester resin waste through at least one component being selected from the group of consisting of dicarboxylic acid and dicarboxylic acid ester with diamine for synthesizing regenerated polyamide.

11. The method of recycling cured unsaturated polyester resin waste in accordance with claim 1, further comprising a step of reacting a decomposition product of said cured unsaturated polyester resin waste through diamine with a decomposition product of said cured unsaturated polyester resin waste through at least one component being selected from the group of consisting of dicarboxylic acid and dicarboxylic acid ester for synthesizing regenerated polyamide.

12. The method of recycling cured unsaturated polyester resin waste in accordance with claim 1, further comprising a step of employing a decomposition product of said cured unsaturated polyester resin waste through diamine as a hardener for epoxy resin, thereby synthesizing regenerated epoxy resin.

13. The method of recycling cured unsaturated polyester resin waste in accordance with claim 1, further comprising a step of reacting a decomposition product of said cured unsaturated polyester resin waste through at least one component being selected from the group of consisting of bisphenol, dihydric phenol and aminophenol with formaldehyde for synthesizing regenerated phenol resin.

14. The method of recycling cured unsaturated polyester resin waste in accordance with claim 1, further comprising a step of reacting a decomposition product of said cured unsaturated polyester resin waste through diamine with diisocyanate for obtaining regenerated polyurea.

* * * * *